(12) United States Patent
Mizutani

(10) Patent No.: US 6,469,085 B1
(45) Date of Patent: Oct. 22, 2002

(54) COOLING AGENT, COOLING PACK AND COOLING BOX

(75) Inventor: Koji Mizutani, Konan (JP)

(73) Assignee: Tutomu Ushio, Nagakute-cho (JP)

( * ) Notice: Subject to any disclaimer, the term of this patent is extended or adjusted under 35 U.S.C. 154(b) by 0 days.

(21) Appl. No.: 09/546,226

(22) Filed: Apr. 10, 2000

(30) Foreign Application Priority Data

Apr. 9, 1999 (JP) .......................................... 11-102418

(51) Int. Cl.$^7$ ................................................. C08K 3/38
(52) U.S. Cl. ...................................... 524/404; 524/423
(58) Field of Search ................................. 524/433, 423, 524/404, 400, 405, 183

(56) References Cited

U.S. PATENT DOCUMENTS 4,637,759 A * 1/1987 Owa et al. ................. 405/270
6,228,487 B1 * 5/2001 Howard et al. ....... 428/355 CN

FOREIGN PATENT DOCUMENTS

| JP | 55161879 A | * | 12/1980 |
| JP | 1-319583 | | 12/1989 |
| JP | 2-92987 | | 4/1990 |
| JP | 2194041 A | * | 7/1990 |
| JP | 11-35930 | | 2/1999 |
| JP | 11-80716 | | 3/1999 |
| JP | 11-349936 | | 12/1999 |

* cited by examiner

Primary Examiner—Edward J. Cain
Assistant Examiner—Katarzyna W. Lee
(74) Attorney, Agent, or Firm—Pillsbury Winthrop LLP

(57) ABSTRACT

A cooling agent including a metal salt aqueous solution and a nonionic polymer as an agent for extending cooling duration, wherein the nonionic polymer has a group with an affinity due to interaction with a water molecule, and is free of an ionic group ionically bound to a metallic ion in the aqueous solution, a cooling pack in which the cooling agent is charged into a pack made of a resin, and a cooling box in which the cooling pack is placed in a cooling box made of a resin foam. The cooling agent, the cooling pack and the cooling box provide long-term cooling duration, and are suited for long-term cooled transportation, cooled storage and cooled display.

7 Claims, 6 Drawing Sheets

F I G. 2
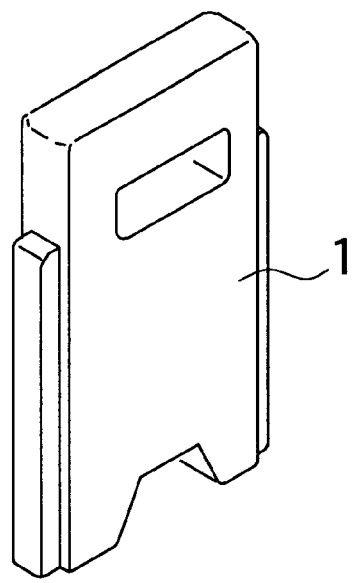

COOLING AGENT, COOLING PACK AND COOLING BOX

BACKGROUND OF THE INVENTION

1. Field of the Invention

The present invention relates to a cooling agent, a cooling pack and a cooling box which are used for long-term cooled transportation, cooled storage and cooled display of products (for example, foods, beverages, chemicals, pharmaceuticals, blood, organs, animals and plants) requiring refrigeration or freezing.

2. Description of the Related Art

A sodium chloride aqueous solution or dry ice has been generally used as an ordinary cooling agent.

However, a cooling agent made of a sodium chloride aqueous solution involves the following two problems.

(a) The cooling duration is short.

As will be described later as a result of Comparative Example 2 in FIG. 4, the cooling performance at the initial stage of the use is lost after 12 hours have passed. Accordingly, this cooling agent is not suited for long-term cooling transportation, cooling storage and cooling display.

(b) A supercooling phenomenon occurs.

A supercooling phenomenon means that even after a theoretical temperature of phase transition (solidification point) from liquid to solid is reached when cooling a product, the phenomenon of phase transition (solidification) does not occur as will be described later, for example, as a result of Comparative Example 1 in Table 1. Such a supercooling phenomenon poses various problems including that installation of a high-quality freezer is required, running costs are increased, an operation efficiency is decreased (temperature is decreased by 3% whenever supercooling of 1° C. occurs), and extra energy is needed.

Further, a cooling agent made of dry ice involves the following two problems.

(c) The cooling duration is short, and after the cooling duration, the cooling property is abruptly lost.

Dry ice exhibits cryogenic properties, but is sublimated in a short time by releasing carbon dioxide gas. Accordingly, its cooling duration is short. Further, when sublimation is completed, the cooling property is of course abruptly lost.

(d) This cooling agent is harmful to the global environment.

Here, a carbon dioxide gas that causes global warming is released.

SUMMARY OF THE INVENTION

It is an object of the invention to provide a cooling agent, a cooling pack and a cooling box which provide a long cooling duration and which are suited for long-term cooled transportation, cooled storage and cooled display (further preferably, with this invention, almost no supercooling phenomenon occurs).

This object is achieved by the following means (1) to (4).

(1) A cooling agent comprising a metal salt aqueous solution, and a nonionic polymer as an agent for extending cooling duration, wherein the nonionic polymer has a group (preferably an amide group) with an affinity due to interaction with a water molecule, and is free of an ionic group that is ionically bound to a metallic ion in the aqueous solution.

Examples of the metal salt can include sodium chloride, ammonium chloride, calcium chloride, magnesium chloride, sodium sulfate, ammonium sulfate, sodium acetate and zinc oxide. An agent can contain at least one metal salt selected from this group.

As the nonionic polymer, poly.N-vinyl acetamide (hereinafter referred to as PNVA), which is a polymer of N-vinyl acetamide, can be exemplified. The basic structure of PNVA is represented by the following formula.

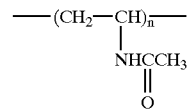

The amount of PNVA is preferably between 0.5 and 10 parts by weight, more preferably between 1 and 5 parts by weight per 100 parts by weight of a metal salt aqueous solution. When the amount is less than this range, the activity of extending the cooling duration is decreased. When the amount is larger than this range, cost is increased, although the activity of extending the cooling duration is hardly changed at all.

Further, it is preferable to add a supercooling inhibitor to the aqueous solution. Examples of the supercooling inhibitor can include sodium borate, sodium hydrogencarbonate and graphite. An agent can contain at least one compound selected from this group.

(2) A cooling agent comprising a sodium chloride aqueous solution, PNVA as an agent for extending a cooling duration, and sodium borate as a supercooling inhibitor.

The cooling agent is preferably an agent in which a phenomenon of phase transition from liquid to solid occurs in a temperature range of −40° to −2° C. The sodium chloride aqueous solution is preferably an aqueous solution containing 1% to 50% by weight of sodium chloride, more preferably an aqueous solution containing 5% to 30% by weight of sodium chloride.

The amount of PNVA is preferably between 0.5 and 10 parts by weight, more preferably between 1 and 5 parts by weight per 100 parts by weight of the sodium chloride aqueous solution. When the amount is less than this range, the activity of extending the cooling duration is decreased. When the amount is more than this range, cost is increased, although the activity of extending the cooling duration is hardly changed at all.

The amount of sodium borate is preferably between 0.05 and 10 parts by weight, more preferably between 0.1 and 5 parts by weight per 100 parts by weight of the sodium chloride aqueous solution. When the amount is less than this range, the activity of inhibiting supercooling is decreased. When the amount is more than this range, cost is increased, although the activity of inhibiting supercooling is hardly changed at all.

(3) A cooling pack in which the cooling agent recited in (1) or (2) is charged (filled) into a pack made of a resin.

(4) A cooling box in which the cooling pack recited in (3) is placed in a cooling box made of a resin foam.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

BRIEF DESCRIPTION OF THE DRAWINGS

FIG. 2 is a perspective view of a pack in which the same cooling agent is charged.

DETAILED DESCRIPTION OF THE PREFERRED EMBODIMENTS

[First Embodiment]

The cooling agent of the first embodiment includes three Examples as shown in Table 1, and it comprises 100 parts by weight of an aqueous solution containing 23% by weight of sodium chloride, 3 parts by weight of PNVA as an agent for extending cooling duration, and 1, 2 or 3 parts by weight of sodium borate as a supercooling inhibitor. The addition of PNVA allows formation of a gel-like cooling agent. Further, a mere aqueous solution containing 23% by weight of sodium chloride was used as a cooling agent in Comparative Example 1.

TABLE 1

|  | Comparative Example 1 | Example 1 | Example 2 | Example 3 |
|---|---|---|---|---|
| Sodium chloride aqueous solution | 100 | 100 | 100 | 100 |
| PNVA | 0 | 3 | 3 | 3 |
| Sodium borate | 0 | 1 | 2 | 3 |
| Solidification starting temperature (° C.) | −40.0 | −34.1 | −30.2 | −26.3 |
| Supercooling temperature (° C.) | 18.9 | 13.0 | 9.1 | 5.2 |

(unit of components: parts by weight)

The solidification starting temperatures given when these cooling agents are cooled and solidified in a freezer are shown in Table 1. Further, the theoretical solidification point of the aqueous solution containing 23% by weight of sodium chloride is −21.1° C. The difference between this solidification point and each solidification starting temperature is shown in Table 1 as a supercooling temperature.

As is apparent from the results, in Comparative Example 1 in which sodium borate is not added, the supercooling temperature is high, whereas in Examples 1, 2 and 3 in which sodium borate is added, the larger the amount, the lower the supercooling temperature. These results reveal that the first embodiment enables the effects that installation of a high-quality freezer can be dispensed with, running cost can be decreased while operation efficiency is increased, and extra energy becomes unnecessary.

[Second Embodiment]

The cooling agent of the second embodiment comprises 100 parts by weight of an aqueous solution containing 20% by weight of sodium chloride, 4 parts by weight of PNVA as an agent for extending cooling duration, and 3 parts by weight of sodium borate as a supercooling inhibitor. Further, a mere aqueous solution containing 20% by weight of sodium chloride was used as a cooling agent in Comparative Example 2, and dry ice as a cooling agent in Comparative Example 3.

Figure 1:
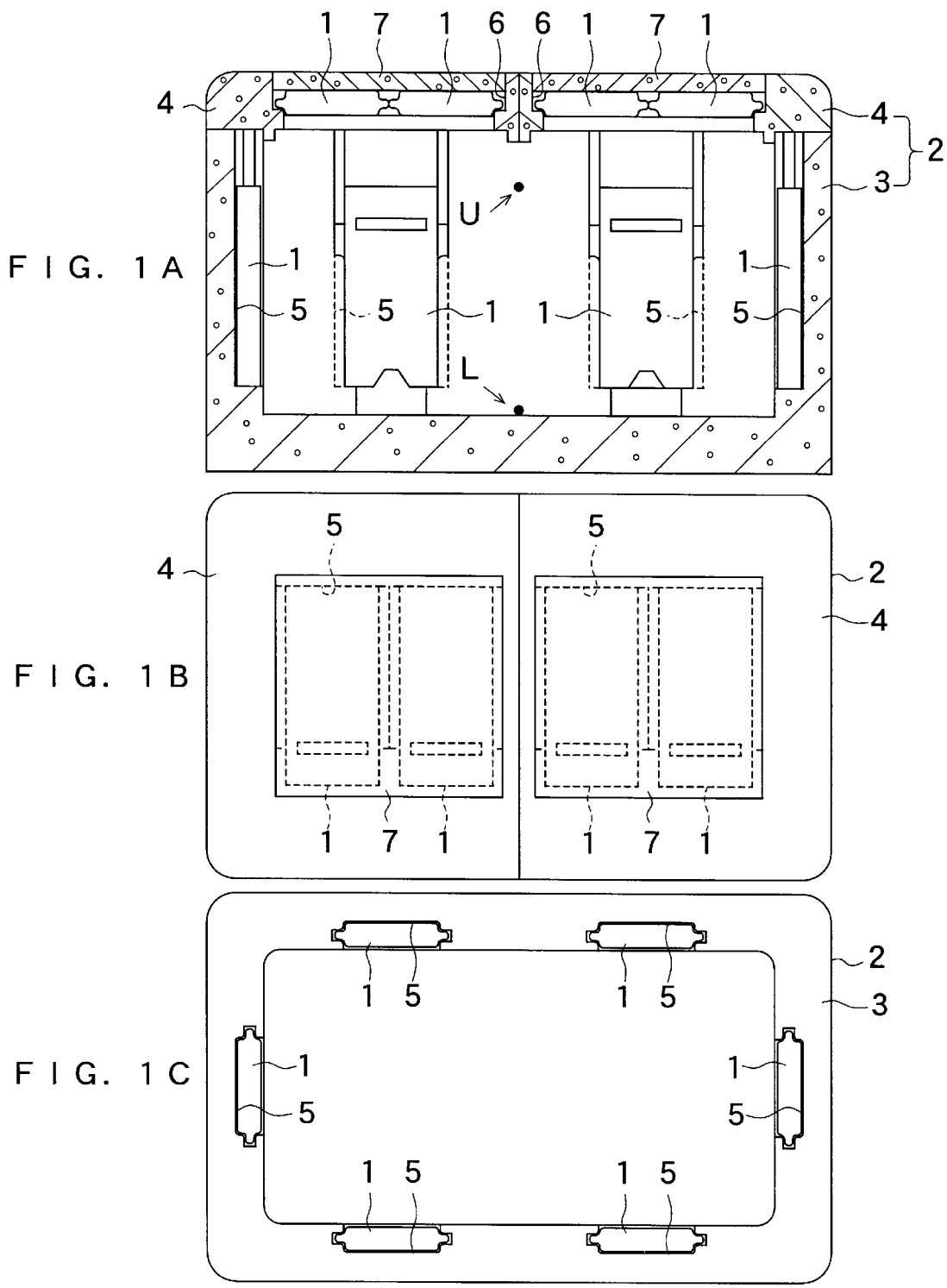
FIG. 1A is a longitudinal sectional view of a cooling box in which the cooling agent of the second embodiment of the invention is used.
FIG. 1B is a plan view of a cover of the same cooling box.
FIG. 1C is a plan view of a body of the same cooling box.

Approximately 1 kg of the cooling agent of the second embodiment was charged (filled) into each flat pack 1 made of a resin as shown in FIG. 2, and cooled and solidified in a freezer. A total of ten such packs 1 (a total of 10 kg) charged with the cooling agent were put into a cooling box 2 made of a polystyrene resin foam used in cooled transportation, as shown in FIG. 1. This cooling box 2 comprises a body 3 having an inner lateral width of approximately 90 cm, an inner length of approximately 48 cm, an inner depth of approximately 50 cm and an internal volume of approximately 217 liters, and a half-split cover 4 placed on an upper opening of the body 3. Two installation grooves 5 were formed in an inner surface of each of a front wall and a rear wall of the body 3, and one installation groove 5 was formed in an inner surface of each of the right and left walls of the body 3. One pack 1 charged with the cooling agent was installed in each of the installation grooves 5. An installation hole 6 was formed in each split cover 4. Two packs 1 charged with the cooling agent were installed in each of the installation holes 6, and a small cover 7 was put thereon.

Further, approximately 1.5 kg of the cooling agent of Comparative Example 2 was each charged (filled) into respectively one each of similar packs (not shown), and cooled and solidified in a freezer. A total of eight such packs (a total of 12 kg) charged with the cooling agent were put into a similar cooling box (not shown, internal volume: approximately 210 liters). Moreover, as dry ice of Comparative Example 3, 8 kg of commercial dry ice was put around the inner bottom of the cooling box 2 show n in FIG. 1.

The cooling box 2 charged with the cooling agent of the second embodiment, the cooling box (not shown) charged with the cooling agent of Comparative Example 2, and the cooling box 2 charged with the cooling agent of Comparative Example 3 were placed in a room maintained at an atmospheric temperature of 40° C. The temperature changes in an upper portion U (located 10 cm down from an upper end of the body 3) and in a lower portion L (the inner bottom of the body 3) in the box as shown in FIG. 1A were measured over 24 hours. During the 24 hours, the cover 4 was opened once for 10 seconds every 1 hour. Further, the inside of the cooling box was made empty.

Figure 3:
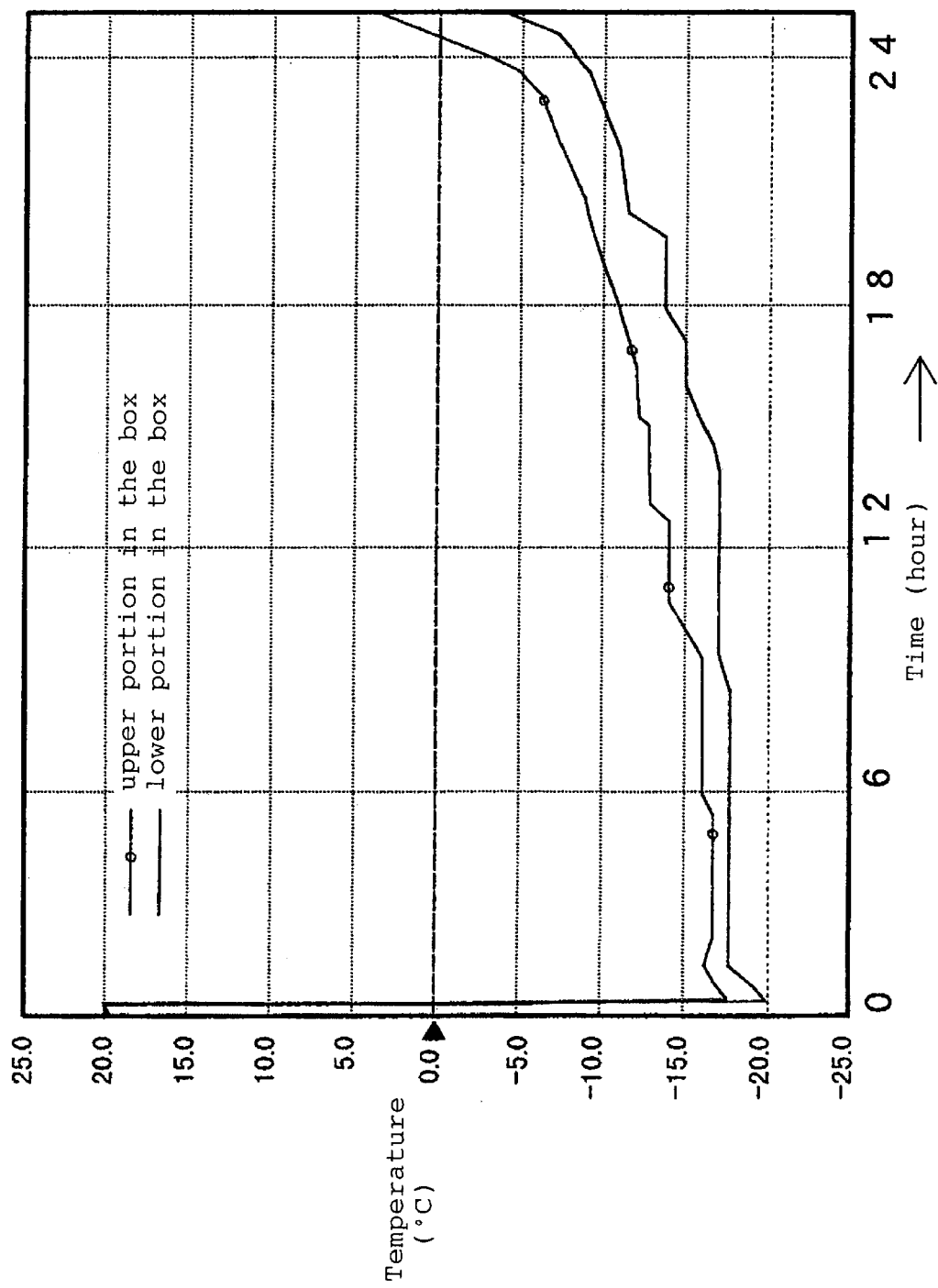
FIG. 3 is a graph showing a temperature change in the cooling box charged with the same cooling agent.
Figure 4:
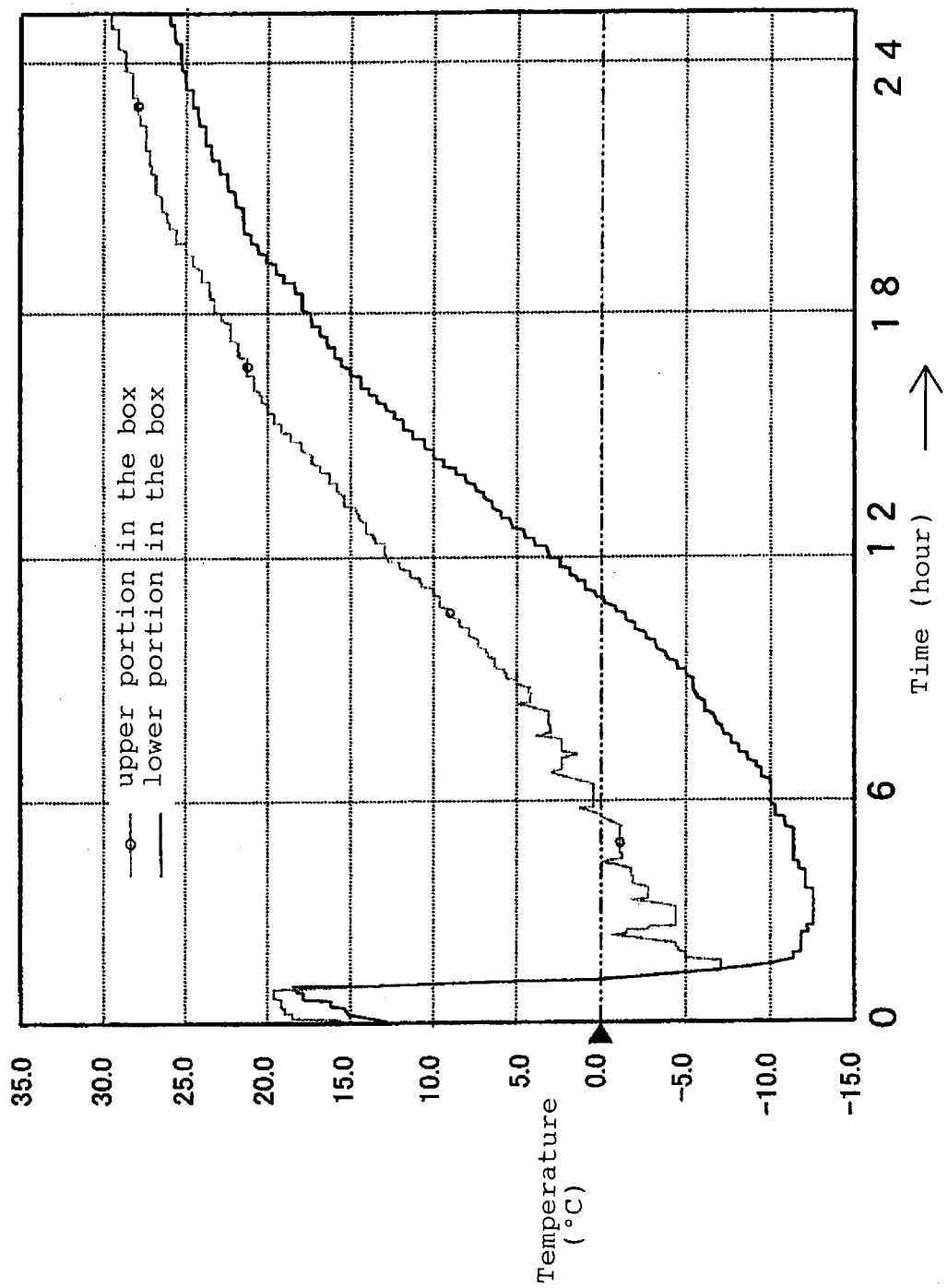
FIG. 4 is a graph showing a temperature change in a cooling box charged with a cooling agent of Comparative Example 2.
Figure 5:
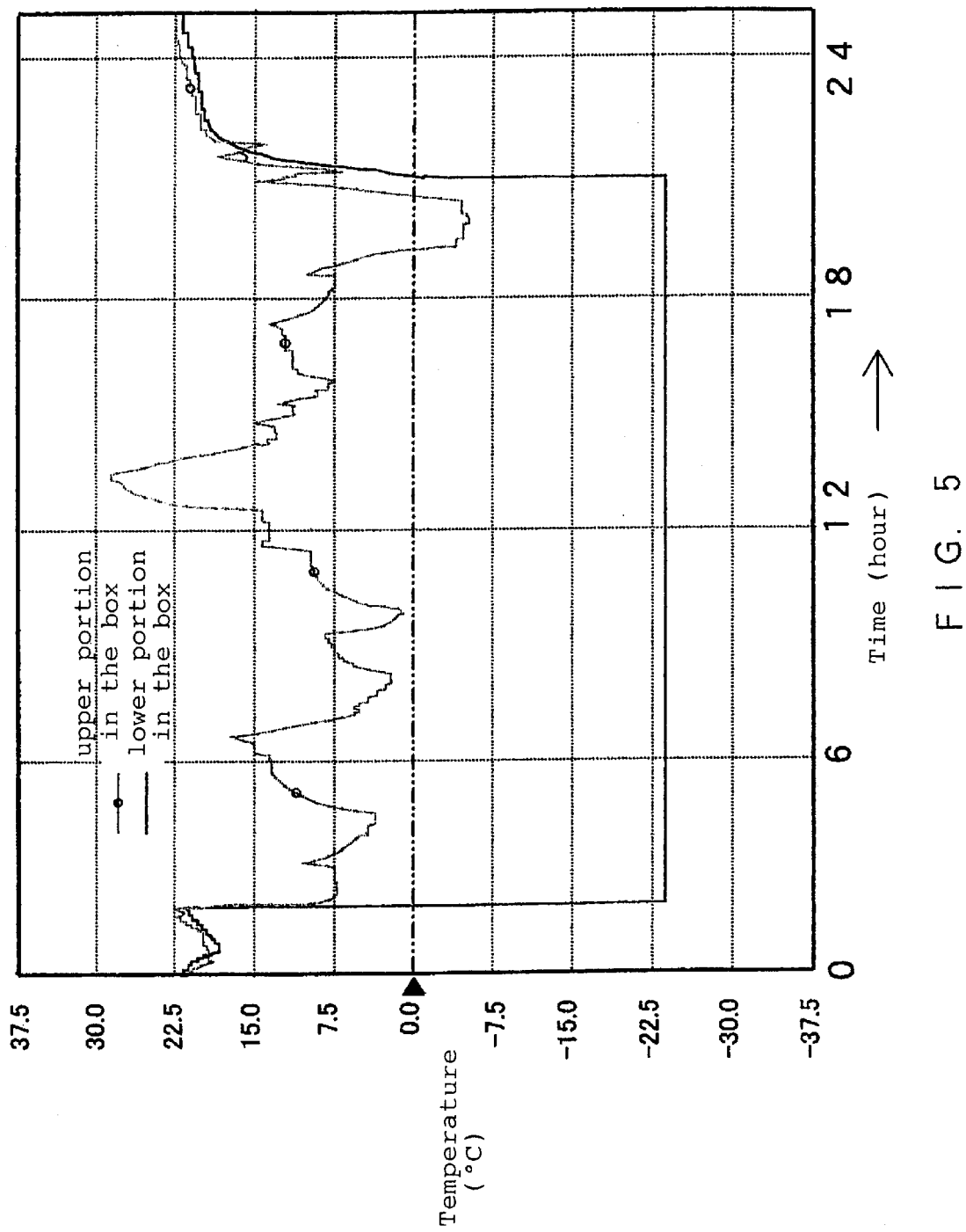
FIG. 5 is a graph showing a temperature change in a cooling box charged with a cooling agent of Comparative Example 3.

The temperature change in the cooling box 2 charged with the cooling agent of the second embodiment is shown in FIG. 3, the temperature change in the cooling box (not shown) charged with the cooling agent of Comparative Example 2 is shown in FIG. 4, and the temperature change in the cooling box 2 charged with dry ice of Comparative Example 3 is shown in FIG. 5, respectively.

As is apparent from the results, in Comparative Example 2 (FIG. 4) using the mere aqueous solution containing 20% by weight of sodium chloride, the temperature of the lower portion L in the box was once decreased to approximately −13° C., but after 12 hours, this temperature increased to higher than 0° C. Further, a temperature difference of approximately 10° C. was found between the upper portion U and the lower portion L in the box. Thus, the temperature was non-uniform. Still further, in Comparative Example 3 using dry ice (FIG. 5), the temperature of the lower portion L in the box was decreased to lower than −23° C., the lower limit measured by the used measuring unit. However, after 21 hours, the temperature was abruptly increased to higher than 0° C., and a temperature difference of approximately 30° C. was found between the upper portion U and the lower portion L in the box. Thus, the temperature was extremely non-uniform. Meanwhile, in the second embodiment (FIG. 3), the temperature of the lower portion L in the box was decreased to approximately −18° C., and this temperature was maintained for a long period of time with slight change. After 24 hours, a cooling property of approximately −8° C. was still exhibited. The temperature difference between the upper portion U and the lower portion L in the box was less than only 5° C. Thus, the temperature was evaluated to be uniform. This result indicates that the second embodiment can extend the cooling duration and provide the optimum characteristics in long-term cooled transportation, cooled storage and cooled display.

[Third Embodiment]

The cooling agent of the third embodiment comprises 100 parts by weight of water, 30 parts by weight of ammonium sulfate, 20 parts by weight of calcium chloride, 5 parts by weight of magnesium chloride and 3 parts by weight of zinc oxide as metal salts, 3 parts by weight of PNVA as an agent for extending cooling duration, and 5 parts by weight of sodium borate as a supercooling inhibitor.

Approximately ⅓ kg of the cooling agent of the third embodiment was charged (filled) into each small pack 1 (not shown), and cooled and solidified in a freezer at −35° C. for 20 hours. A total of three such packs (a total of 1 kg) charged with the cooling agent were put in a cooling box (not shown) made of a polystyrene resin foam, having an internal volume of approximately 20 liters and used in cooled transportation, and were placed on the inner bottom.

The cooling box charged with the cooling agent of the third embodiment was placed in a room maintained at an atmospheric temperature of 19° C. to 20° C. The temperature change in an upper portion (6 cm up from the inner bottom) and a lower portion (located between the inner bottom and the pack charged with the cooling agent) in the box was measured over 16 hours. During the 16 hours, the cover 4 was never opened. Further, the inside of the cooling box was made empty.

Figure 6:
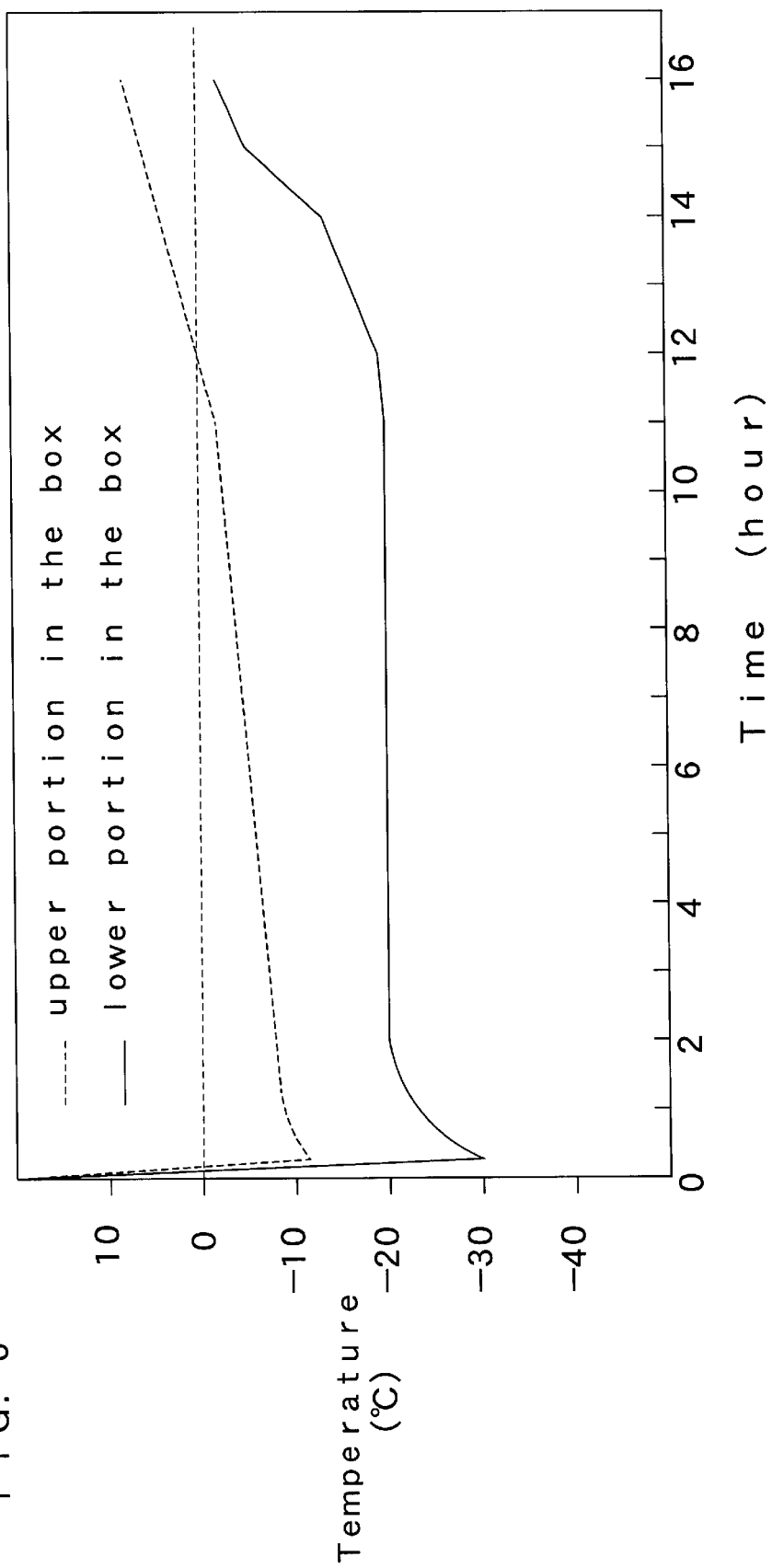
FIG. 6 is a graph showing a temperature change in a cooling box charged with a cooling agent of the third embodiment of the invention.

The temperature change in the cooling box charged with the cooling agent of the third embodiment is shown in FIG. 6. In the third embodiment, the temperature of the lower portion in the box was once decreased to approximately −30° C., and a temperature of approximately −20° C. was then maintained for a long period of time with slight change. After 12 hours, a satisfactory cooling property was still exhibited.

Incidentally, the invention is not limited to these embodiments, and the following modifications can be made, as required, without deviating from the gist of the invention.

(1) The concentration of sodium chloride is changed, or sodium chloride is replaced with ammonium chloride, calcium chloride, sodium sulfate, ammonium sulfate or sodium acetate. Incidentally, when the concentration of sodium chloride is decreased or sodium chloride is replaced with, for example, ammonium chloride, the solidification point of the cooling agent is increased. However, there exists a method according to this solidification point. Further, sodium chloride can be replaced with magnesium chloride or zinc oxide.

(2) PNVA as an agent for extending a cooling duration is replaced with another nonionic polymer having an amide group with an affinity due to interaction with a water molecule, and is free of an ionic group tonically bound to a metallic ion in the aqueous solution.

(3) Sodium borate as a supercooling inhibitor is replaced with sodium hydrogencarbonate, graphite or other corresponding compounds having the activity of inhibiting supercooling.

As many apparently widely different embodiments of this invention may be made without departing from the spirit and scope thereof, it is to be understood that the invention is not limited to the specific embodiments thereof except as defined in the appended claims.

What is claimed is:

1. A cooling agent, comprising:
   a metal salt aqueous solution containing 10% to 50% by weight of a metal salt;
   a nonionic polymer as an agent for extending cooling duration; and
   a supercooling inhibitor;
   wherein said nonionic polymer is poly.N-vinyl acetamide;
   wherein the amount of said poly•N-vinyl acetamide is 0.5 to 10 parts by weight per 100 parts by weight of the metal salt aqueous solution; and
   wherein said cooling agent comprises substantially no alcohol.

2. The cooling agent as set forth in claim 1, wherein said metal salt is at least one selected from the group consisting of sodium chloride, ammonium chloride, calcium chloride, magnesium chloride, sodium sulfate, ammonium sulfate, sodium acetate and zinc oxide.

3. The cooling agent as set forth in claim 1, wherein said supercooling inhibitor is at least one selected from the group consisting of sodium borate, sodium hydrogencarbonate and graphite.

4. A cooling agent, comprising:
   a sodium chloride aqueous solution;
   poly.N-vinyl acetamide as an agent for extending cooling duration, and
   sodium borate as a supercooling inhibitor;
   wherein the sodium chloride aqueous solution is an aqueous solution containing 10% to 50% by weight of sodium chloride;
   wherein the amount of said poly-N-vinyl acetamide is 0.5 to 10 parts by weight per 100 parts by weight of the sodium chloride aqueous solution;
   wherein the amount of said sodium borate is 0.05 to 10 parts by weight per 100 parts by weight of the sodium chloride aqueous solution; and
   wherein said cooling agent comprises substantially no alcohol.

5. The cooling agent as set forth in claim 4, wherein a phenomenon of phase transition from liquid to solid occurs in a temperature range of −40° to −2° C.

6. A cooling pack in which the cooling agent as claimed in claim 1 is charged into a pack made of a resin.

7. A cooling box in which the cooling pack as claimed in claim 6 is placed in a cooling box made of a resin foam.

* * * * *

UNITED STATES PATENT AND TRADEMARK OFFICE
CERTIFICATE OF CORRECTION

PATENT NO.      : 6,469,085 B1
DATED           : October 22, 2002
INVENTOR(S)     : Koji Mizutani It is certified that error appears in the above-identified patent and that said Letters Patent is hereby corrected as shown below:

<u>Title page,</u>
Item [73], Assignee, please replace "Tutomu Ushio, Nagakute-cho (JP)" with
-- Takazo IIDA, Isehara-shi, JAPAN --.

Signed and Sealed this

Thirteenth Day of May, 2003

JAMES E. ROGAN
*Director of the United States Patent and Trademark Office*